R. W. NIVER.
MEANS FOR CONVEYING WARE TO LEERS.
APPLICATION FILED AUG. 19, 1918.
1,356,167.
Patented Oct. 19, 1920.
3 SHEETS—SHEET 1.
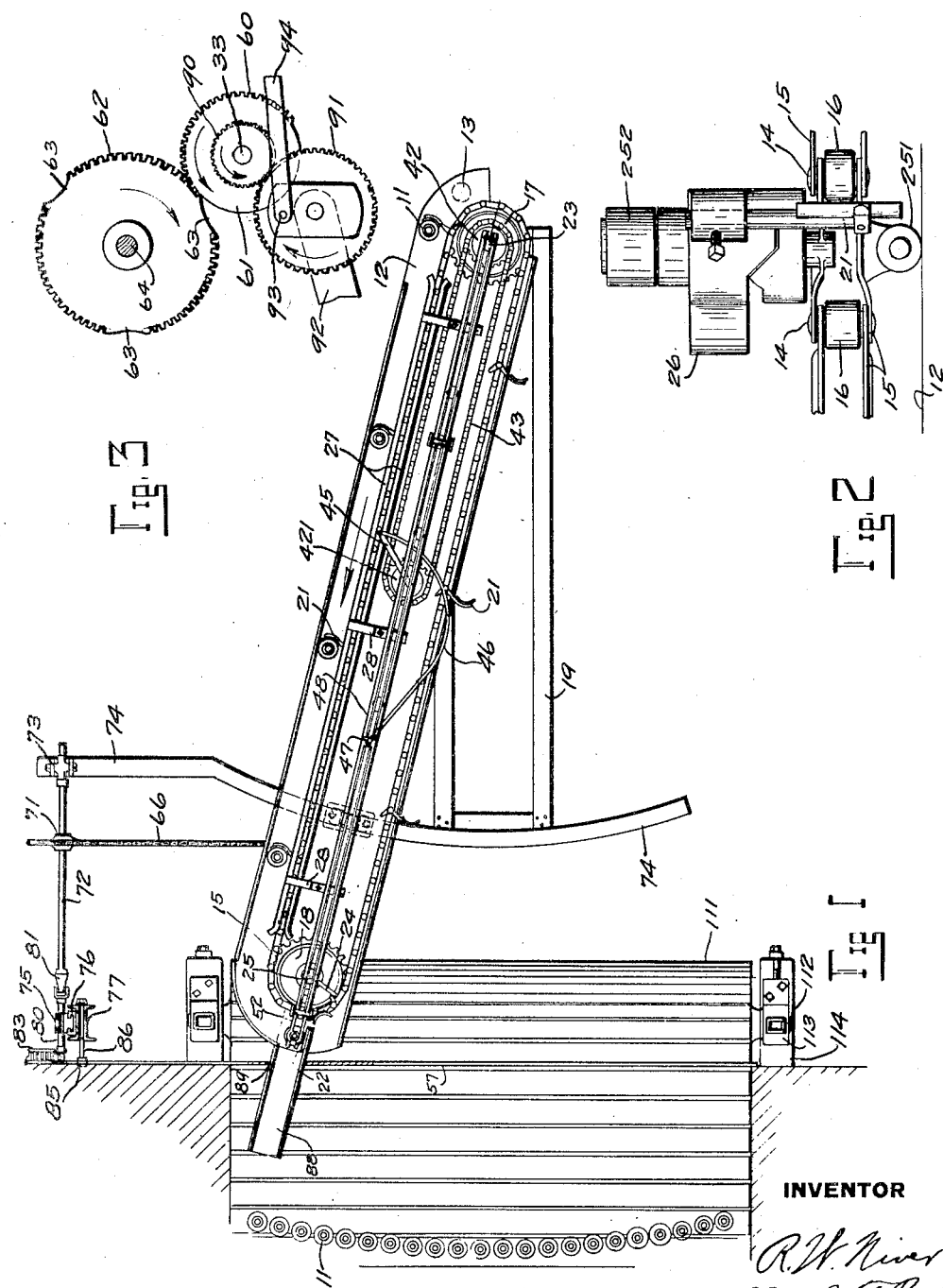
INVENTOR
R. W. Niver
By J. F. Rule
His attorney.

R. W. NIVER.
MEANS FOR CONVEYING WARE TO LEERS.
APPLICATION FILED AUG. 19, 1918.
1,356,167.
Patented Oct. 19, 1920.
3 SHEETS—SHEET 2.
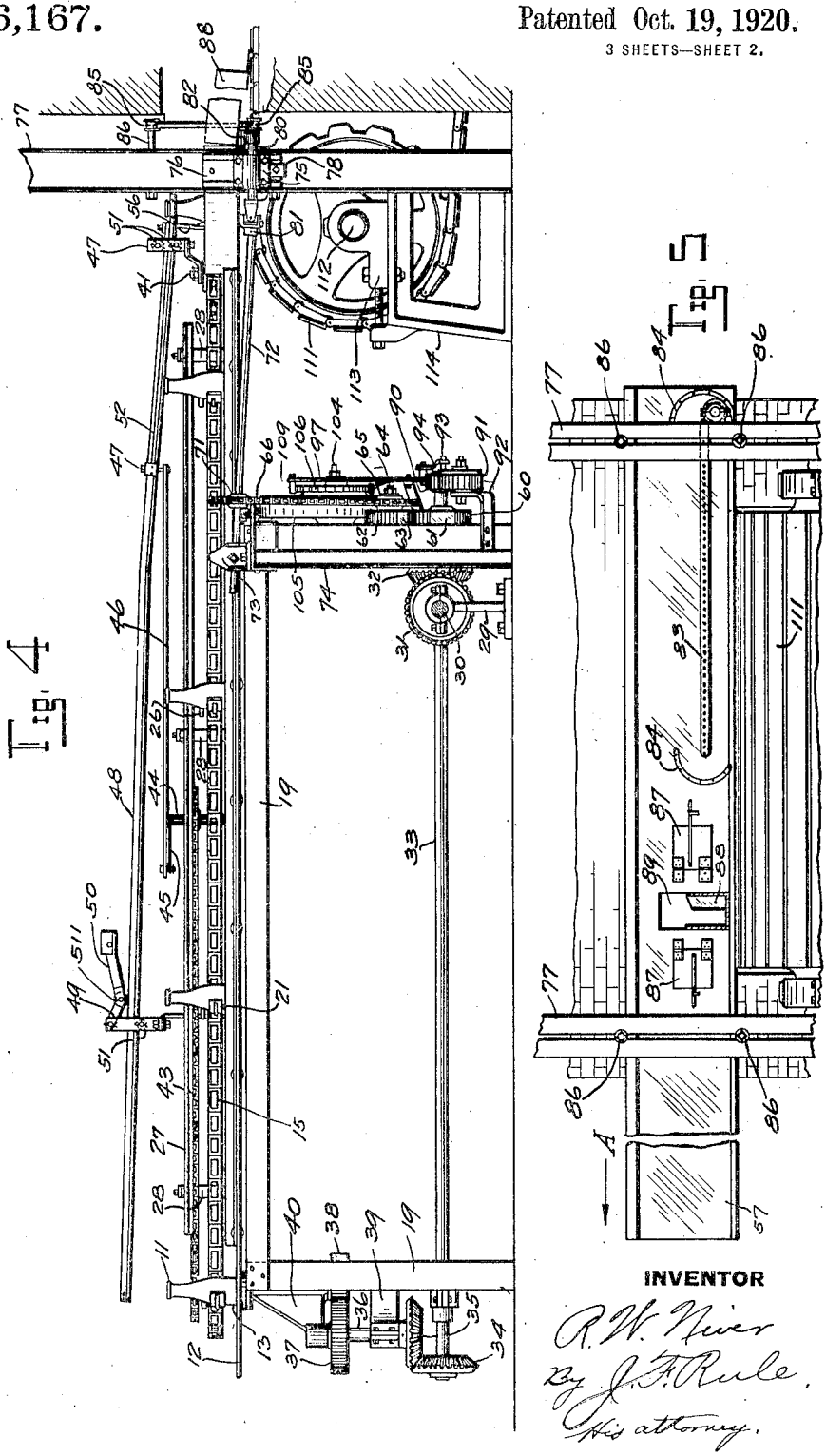
INVENTOR
R. W. Niver
By J. F. Rule
His attorney.

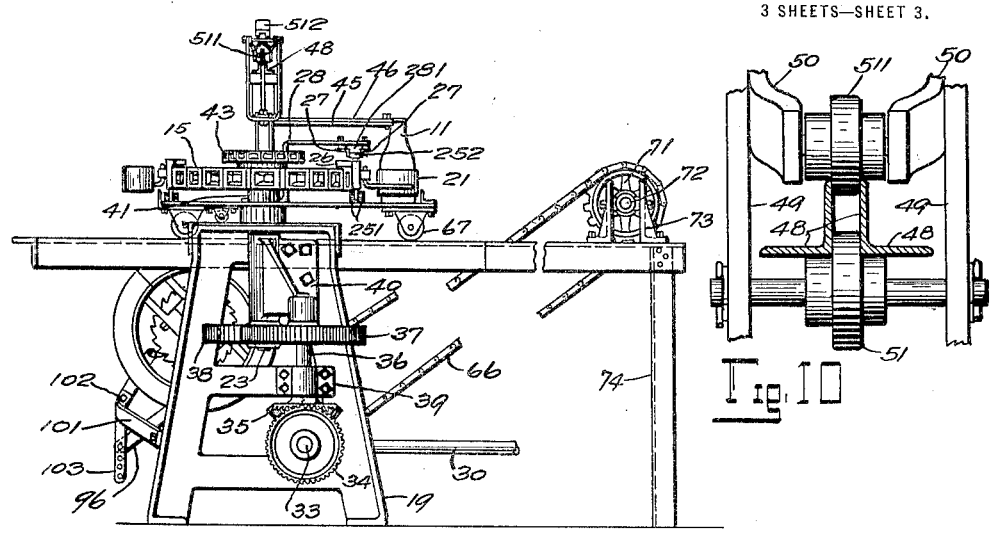
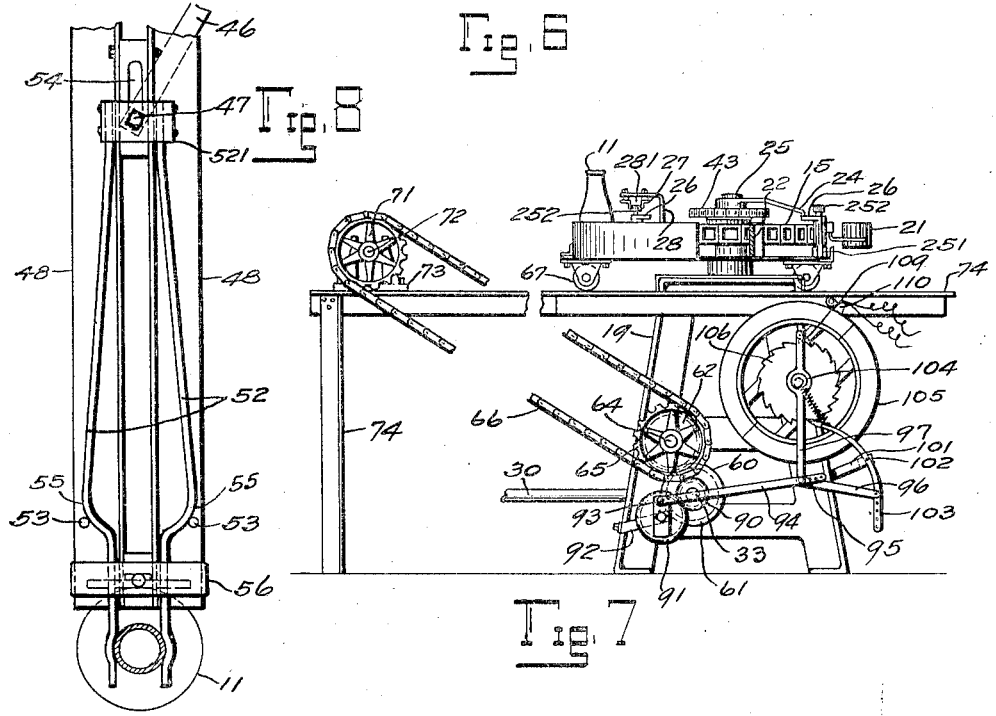
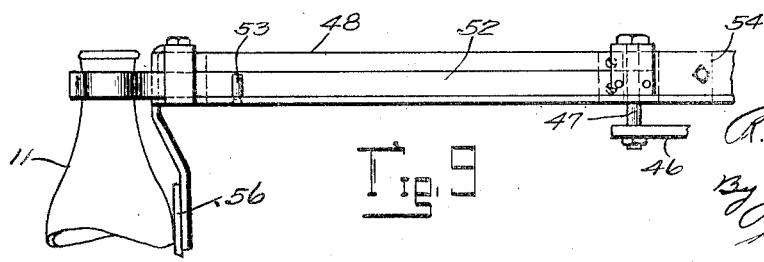

UNITED STATES PATENT OFFICE.

RAYMOND W. NIVER, OF ELMIRA, NEW YORK, ASSIGNOR TO THE OWENS BOTTLE MACHINE COMPANY, OF TOLEDO, OHIO, A CORPORATION OF OHIO.

MEANS FOR CONVEYING WARE TO LEERS.

1,356,167.     Specification of Letters Patent.     Patented Oct. 19, 1920.

Application filed August 19, 1918. Serial No. 250,424.

*To all whom it may concern:*

Be it known that I, RAYMOND W. NIVER, a citizen of the United States, residing at Elmira, in the county of Chemung and State of New York, have invented new and useful Improvements in Means for Conveying Ware to Leers, of which the following is a specification.

My invention relates to improvements in apparatus for feeding bottles or other ware to a leer. An object of the invention is to provide an apparatus which is practical and reliable in operation for receiving the bottles or other articles supplied from the forming machine, conveying them to the leer and evenly distributing them in spaced relation on the leer conveyer.

In its preferred form the invention comprises an endless carrier mounted on a swinging horizontal table for conveying the bottles to the leer. The forward end of the table is arranged to swing transversely across the front end of the leer, means being provided for moving the table step by step so that the bottles discharged from the conveyer are arranged in a row extending across the leer. A suitable device for transferring the bottles from the conveyer table to the leer comprises a gripper to engage the bottle at the forward end of the conveyer table and means to actuate said gripper to carry the bottle into the leer. A sliding door extending across the front end of the leer is connected with the conveyer table and moved across the leer step by step with said table. Said door serves to close the end of the leer, except at the small opening therein, through which the bottles enter the leer. Suitable mechanism is provided for operating the several parts in timed relation to each other and to the delivery of the ware thereto.

Other features and advantages of the invention will appear hereinafter.

In the accompanying drawings:

Figure 1 is a plan view showing the entire feeding device and its relation to the leer.

Fig. 2 is a detail view of a flight and its operating mechanism.

Fig. 3 is an elevational view of a train of gears.

Fig. 4 is a side elevation of the apparatus.

Fig. 5 is a front elevation of the reciprocating leer door and the mechanism for operating it.

Fig. 6 is an elevation of the receiving end of the conveyer.

Fig. 7 is an elevation of the discharging end of the conveyer.

Fig. 8 is a plan view of the gripper which transfers the bottles from the conveyer to the leer.

Fig. 9 is a side elevation of the same.

Fig. 10 is a detail view of a holding device for the pusher rod.

The bottles 11 or other articles are discharged from the forming machine, any suitable or approved intermediate mechanism being employed to take the bottles from the machine and place them in upright position on the conveyer table 12 at the point 13 (Fig. 1). An endless horizontally rotating chain 15 runs on sprockets 17 and 18 mounted on shafts 23 and 25 respectively. Each of the pivot pins 14 (Fig. 2) of the chain is provided with an anti-friction roller 16 which engages the sprockets. Uniformly spaced along the chain 15 are laterally extending flights 21, which successively engage the bottles as they are delivered to the conveyer, and carry them along the table until they are arrested by a stationary stop 22.

As the bottles are arrested they automatically throw the flights backward approximately 90°, allowing them to pass beyond the stop. After passing this stop a sufficient distance to avoid interference, a laterally extending finger 24 mounted on the shaft 25 contacts with a lug 26 on the flight, throwing it forward into its operative position.

Mounted on the lower portion of the chain 15 and directly beneath the flights is a roller 251 which gives the chain a rolling support. Above and extending along the chain 15 is a guide consisting of a pair of spaced angle bars 27, rigidly supported by brackets 28 attached to the table 12. These bars form a channel or guideway along which travel rollers 252 mounted on the upper ends of the bottle carrying flights, thereby causing the chain 15 to travel in a straight path and preventing it from wabbling.

For a more complete description of the flights and roller support, reference may be had to the patent to C. S. Dayton, 1,148,474.

Referring to Fig. 4, a drive shaft 30 having bearings in a standard 29 carries a bevel gear 31 meshing with a bevel gear 32 mounted on a shaft 33. This shaft supported at its opposite ends by the conveyer frame 19, also carries a bevel gear 34 which meshes with a gear 35 mounted on a shaft 36, supported for rotation in bearing brackets 39 and 40. A spur gear 37 on the shaft 36 meshes with a gear 38 on the shaft 23, which is mounted in the bracket 40 and carries the chain driving sprockets 17 and 42. The conveyer chain and the pusher mechanism are driven through the above gearing.

Driven by the sprocket 42 is a chain 43 which drives a sprocket 421 mounted on a vertical shaft 44, which shaft is rotatably mounted on the conveyer table. The shaft 44 carries a laterally extending arm 45, pivotally attached to which is a curved connecting rod 46 having a pivoted connection 47 with the pusher 48. The rotation of the shaft 44 through the above mentioned connections reciprocates the pusher.

The connecting rod 46 is connected by a pivot pin 47 with a bottle gripping device comprising spring arms 52 attached to a yoke 521 carrying the pivot pin 47. The gripping device is mounted for reciprocating movement lengthwise of the pusher bar 48. As the rod 46 moves the gripper forward, pins 53 on the bar 48 engage cam surfaces 55 and cam the jaws inward to grip a bottle which has been arrested by the stop 22. The gripper is now at the limit of its forward movement relative to the pusher bar, said movement being determined by a slot 54 through which the pin 47 extends. The continued advance of the rod 46 moves the bar 48 forward and carries the bottle forward on to the leer. As the rod 46 returns it first moves the gripper back along the bar 48, releasing the arms from the pins 53 and permitting them to spring outward to release the bottle. The pusher bar 48 is then withdrawn, carrying the gripper with it preparatory to operating on the next bottle.

The pusher bar is supported and guided on rolls 51. A friction roll 511 mounted on weighted arms 50 acts as a brake to hold the pusher bar stationary while the gripping jaws are being opened and closed. Attached to the front end of the pusher is a steadier 56 that contacts with the side of the bottle 11 in its movement forward and steadies it as the jaws release their hold. In order that the jaws may release the bottle, the friction rollers must hold the pusher until the gripper has moved backward the length of the slot 54, then the gripper and pusher return together to position for operating on the next bottle.

Keyed to the shaft 33 is a mutilated gear 60 (Fig. 3) having a rest portion 61 which comprises one-half of its circumference, the other half being provided with gear teeth which mesh with a mutilated gear 62 having rest portions 63. The gear 62 is mounted to rotate on a stationary shaft 64. Attached to the gear 62 is a sprocket 65 which, through a chain 66, drives another sprocket 71 keyed to a horizontal shaft 72. Said shaft is mounted at one end in a pivot bearing 73 on the conveyer track frame 74. This bearing is so constructed that the other end of the shaft may have a vertical swinging motion, caused by the movement of a sliding bearing 75 in a stationary slideway 76 mounted on the leer support beam 77. On the slideway is an adjustable stop 78 to control the movement downward of the slide bearing 75. Journaled in the bearing 75 is a short shaft 80 connected to the shaft 72 by a universal joint 81, and on the opposite end is mounted a pinion 82, said pinion meshing with a rack 83 attached to the leer sliding door. The pinion 82 has an intermittent rotating movement and meshes with the under side of the rack when sliding the leer door in the direction of the arrow "A" (Fig. 5) and on the upper side when operating in the opposite direction. When the pinion reaches either of the ends of the rack it is guided around to the opposite side by a circular guide 84 rigid on the leer door 57. The leer door is hung and guided by rollers 85 with their pins 86 horizontally disposed, while the guides 84 act as stops for the door in either direction. The door is also provided with two peek holes 87.

By means of a slightly inclined trough 88, rigidly attached to and forming an extension of the conveyer table 12, projecting into the leer through an opening 89 in the leer door 57, the inner end of the conveyer table is caused to move horizontally with the leer door.

Mounted on the end of the continuously rotating shaft 33 is a pinion 90 meshing with a spur gear 91 mounted on a bracket 92 attached to the conveyer frame 19. Rigidly attached to the gear 91 is an eccentric pin 93 having pivotally connected thereto a bar 94. In the opposite end of the bar 94 is a series of holes 95 providing an adjustable connection with a link 96 and a lever 97. Mounted on the conveyer frame 19 is a bracket 101 to which is pivoted at 102, a pawl 103. A pawl 109 is pivotally mounted on the end of the lever 97. As the bar 94 reciprocates, it causes the pawls 103 and 109 to alternately drive a ratchet wheel 106.

On the frame 19 is mounted a stationary shaft 104 carrying a commutator 105 to which the ratchet wheel 106 is rigidly attached. The commutator through its ratcheting movement makes one revolution for every row of bottles placed in the leer by the pusher, as the table swings from one side to the other. The commutator may be of a standard construction and after making a complete revolution the contact brushes 110 mounted on the conveyer track 74 automatically close an electrical circuit for a motor which operates the leer conveyer 111. This conveyer moves forward just a sufficient distance to allow another row of bottles 11 to be placed thereon, without coming in contact with the previously placed bottles. The leer conveyer runs on sprockets on a horizontal shaft 112 mounted in bearings 113 on the standards 114.

The operation may be summarized as follows:

The endless conveyer 15 operates continuously to bring the bottles 11 successively to discharging position against the stop 22. The pusher rod 48 is given one complete reciprocation for each bottle and thereby operates to grip the bottle at the stop 22, push it forward along the trough or guide 88 and onto the leer conveyer 111, the gripper then releasing the bottle and returning with the pusher rod 48 preparatory to taking hold of the next succeeding bottle. The leer door 57 is advanced step by step, being operated in timed relation to the pusher bar 48 so that the forward end of the conveyer 15 is moved across the end of the leer step by step, being advanced a step after each bottle is placed thereon, so that the bottles are evenly spaced in a row or arc across the leer. The conveyer table is at rest while a bottle is being placed on the leer. When a row has been completed the commutator 105 closes an electrical circuit controlling means for advancing the conveyer platform 111 into position to receive the next row of bottles, which is deposited thereon during the return movement of the conveyer across the front of the leer.

Variations may be resorted to without departing from the spirit or scope of my invention and some portions of the invention may be used without others.

What I claim is:

1. The combination with a leer, of a sliding door for the front of the leer having an opening therein, a platform, a conveyer operable to convey articles *seriatim* along the platform to a position in front of the leer door, means to transfer the articles from said position through said opening and deposit them in the leer, and means to move the discharging end of said conveyer and platform, said transfer means and the door transversely to the direction in which the articles are carried toward the leer, and cause said articles to be arranged in a row within the leer.

2. The combination with a leer including a front wall or closure having an opening for the introduction of articles to be annealed, of a platform or table, means to convey articles over said platform toward the leer to a discharging position outside of said closure, means for transferring said articles from said discharging position through said opening into the leer, and means for causing said discharging position and said opening to advance transversely of the leer so that the articles are arranged in a row extending across the leer.

3. The combination with a leer, of a platform or table, an endless conveyer mounted on said table, flights carried by said conveyer for engaging bottles or other articles and moving them along said table toward the leer, means for swinging said table horizontally about a pivot adjacent its receiving end and thereby moving the discharging end of said table and conveyer transversely across the leer, a door extending across the front of the leer and beyond the leer, said door being between the leer and the discharging end of the conveyer and having an opening, a reciprocating transfer device by which the articles are transferred from the table through said opening into the leer, and means for causing said door to move with the swinging end of the table across the leer.

4. The combination with a leer, of a door or closure for the front end of the leer, said door having an opening through which articles may be placed in the leer, automatic means for moving said door in the direction of its length and thereby moving said opening across the leer, a conveyer outside the leer arranged to convey articles to a position outside of and adjacent to said opening, and automatic means moving with said door to take said articles off the conveyer and move them through said opening into the leer.

5. The combination with a leer, of a door forming a closure for the front of the leer, said door having an opening through which articles may be passed into the leer, a conveyer by which articles are brought to a position of rest adjacent said opening, means for moving said door and the conveyer across the front of the leer, and causing said rest position to shift with said opening across the leer and means shiftable with said opening for projecting said articles from said rest position through said opening and depositing them in rows within the leer.

6. The combination with a leer, of a door forming a closure for the front of the leer, said door having an opening through which articles may be passed into the leer, a conveyer by which articles are brought to a position outside of and adjacent to said opening, means forming a guideway extending from said position through said opening into the leer, means coöperating with said conveyer to project the articles along said guideway away from the conveyer into the leer, and means for moving said conveyer, guideway and door transversely of the leer to deposit said articles in rows within the leer.

7. Means for conveying bottles or other articles comprising a table and endless conveyer, flights on said conveyer arranged to engage articles and move them along said table, means for ejecting the articles from said table, comprising a pusher bar, a gripper carried by said bar, and means to actuate said gripper to grip an article and to actuate said pusher and thereby carry said article off said table.

8. The combination with a platform or table, of an endless conveyer moving over said table and comprising arms to engage articles and move them along said table, a stop to arrest said articles, means to eject the articles from said table, said means comprising a pusher bar, gripping arms carried by said bar, and means to actuate said arms to grip the article and then actuate said bar to carry the article off the platform and then release said article.

9. In an apparatus for the manufacture of bottles and similar glassware, the combination with a leer, of a reciprocating leer door, an oscillating table for said glassware, said table extending from a point outside and central to the leer, through the leer door, an endless conveyer chain operating over said table and carrying flights for engaging the bottles placed upon the table and pushing them along to the forward end of the table, and a reciprocating pusher operating over and parallel to said conveyer to engage the bottles and deposit them upon the leer carrier.

10. The combination with an endless carrier comprising arms arranged at regular intervals to engage articles and move them with the carrier, of a stop to arrest said articles and release them from said arms, and a reciprocating device operating in timed relation to said arms to grip the articles at said stop and move them beyond the carrier and then release them.

11. The combination with an endless carrier comprising arms arranged at regular intervals to engage articles and move them with the carrier, of a stop to arrest said articles, and a reciprocating device operating in timed relation to said arms to engage the articles at said stop and move them beyond the carrier, said device comprising a pair of gripping arms to grip the articles while at said stop, and means to actuate said arms to release the articles.

12. The combination with an endless conveyer comprising means to engage articles serially and transfer them to a predetermined position, a gripping device, means to cause the gripping device to grip said articles in said position, means to bodily reciprocate the gripping device to carry the articles beyond said position, and means to actuate the gripping device to release said articles.

13. The combination with an endless conveyer comprising flights to engage articles and move them lengthwise of the conveyer, a stop at one end of the conveyer in the path of said articles as they are advanced by said flights, the latter mounted to yield and thereby pass the arrested articles, and a reciprocating pusher by which the articles are moved from said stop position to a point beyond the conveyer.

14. The combination with an endless conveyer comprising flights to engage articles and move them lengthwise of the conveyer, a stop at one end of the conveyer in the path of said articles, a pusher rod, a gripping device carried thereby, and means to actuate said gripping device to engage an article while at said stop position, move said article beyond the conveyer and then actuate the gripping device to release said article.

15. The combination with a leer, of an endless conveyer comprising flights by which articles are carried toward the leer, and a transfer device by which the articles are carried from the conveyer to the leer, comprising a gripper to grip said articles, and means to reciprocate said gripper and move the articles into the leer.

16. The combination with a leer, of an endless conveyer comprising flights by which articles are carried toward the leer, a transfer device by which the articles are carried from the conveyer to the leer, comprising a gripper to grip said articles and means to reciprocate said gripper and move the articles into the leer, and means to shift said conveyer and transfer device step by step across the leer to deposit the articles in a row across the leer.

17. The combination with a leer, of an endless conveyer, a platform on which said conveyer is mounted, the latter comprising flights to engage articles and move them along the platform toward the leer and then release them, a trough extending from said platform into the leer, and means to move each article from said platform along said trough into the leer before the next succeeding article is released from the conveyer.

18. The combination with a leer, of an endless conveyer, a platform on which said conveyer is mounted, the latter comprising flights to engage articles and move them along the platform toward the leer, a trough extending from said platform into the leer, means to move the articles from said platform along said trough into the leer, a door forming a closure for the front of the leer, said door having an opening at said trough through which the articles pass into the leer, and means to move said door and conveyer step by step transversely of the leer.

19. The combination with a leer, of a door forming a closure for the end of the leer, a rack connected to and extending lengthwise of the door, a pinion meshing with said rack, and means to drive said pinion and thereby cause the rack to reciprocate, the pinion running above the rack as the latter moves in one direction and beneath the rack as it moves in the reverse direction, whereby said door is reciprocated, said door having an opening through which articles are admitted to the leer, the door being of a length to close the front of the leer at all times.

20. The combination with a leer, of a door forming a closure for the end of the leer, a rack connected to and extending lengthwise of the door, a pinion meshing with said rack, means to drive said pinion and thereby cause the rack to reciprocate, the pinion running above the rack as the latter moves in one direction and beneath the rack as it moves in the reverse direction, whereby said door is reciprocated, said door having an opening through which articles are admitted to the leer, the door being of a length to close the front of the leer at all times, an endless conveyer by which articles are conveyed to a position in front of said opening, and means for transferring articles from said position through said opening.

21. The combination with a leer, of a conveyer by which articles are carried to a position adjacent to the leer, a reciprocating pusher bar, a pair of gripping arms mounted on said bar and having a lost motion connection therewith, means to move said arms on the bar and thereby cause them to grip an article, then to move said bar to carry the article into the leer, then to move said arms in a reverse direction relative to the bar to release the article, and then to retract said bar and arms.

22. The combination with a leer, of a door forming a closure for the end of the leer, a rack connected to and extending lengthwise of the door, a pinion meshing with said rack, a conveyer by which articles are conveyed from a point remote from the leer to a position adjacent said door, the latter being provided with an opening, means for transferring articles from said position through said opening, and means for reciprocating said door and the end of the conveyer adjacent said door, including connections between the conveyer and door, whereby the articles are placed in rows within the leer.

Signed at Elmira, in the county of Chemung and State of New York, this 12 day of August, 1918.

RAYMOND W. NIVER.